No. 692,469. Patented Feb. 4, 1902.
C. W. McCUTCHEN.
HOT WATER APPLIANCE HEATING APPARATUS.
(Application filed Feb. 21, 1901.)
(No Model.)
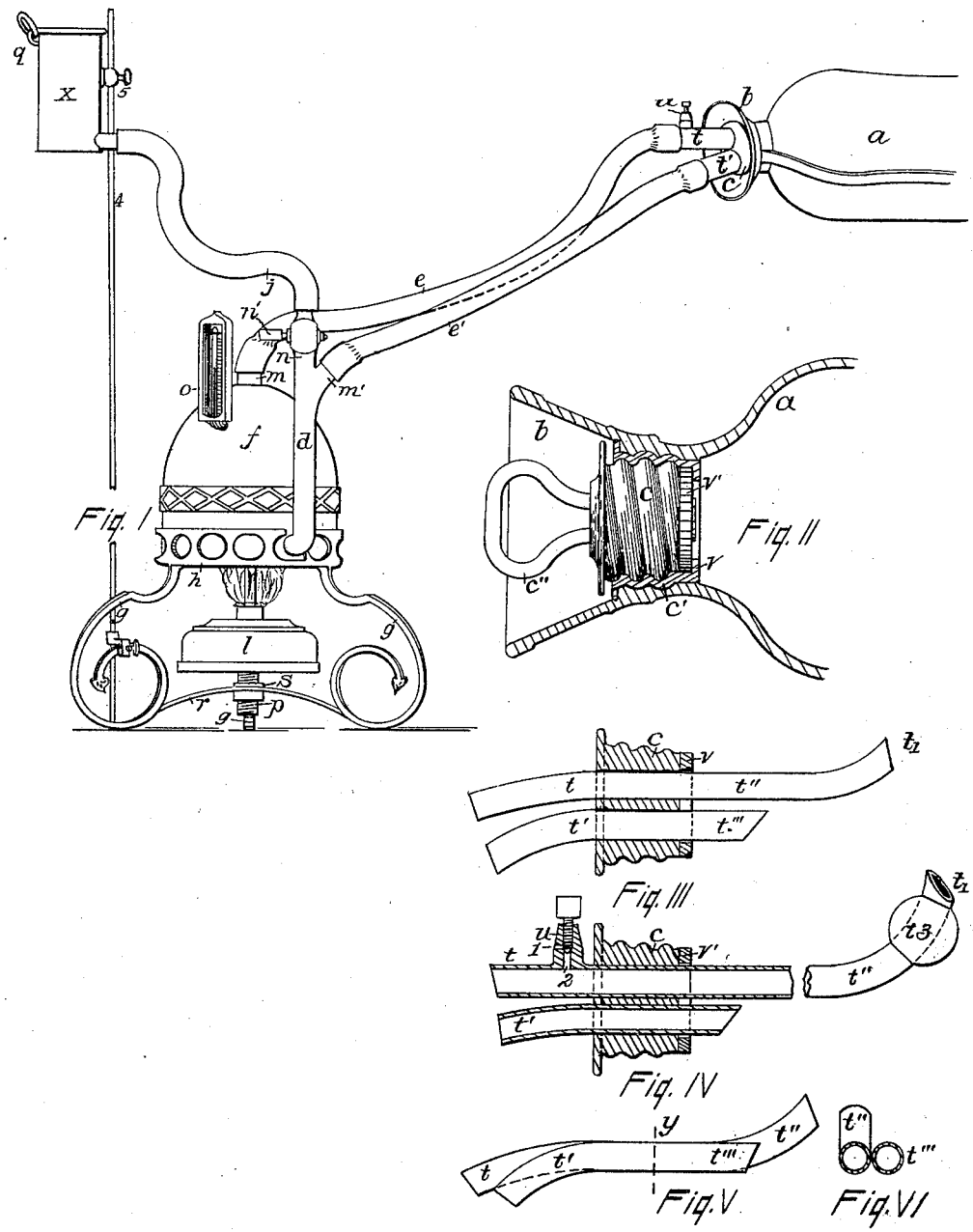

UNITED STATES PATENT OFFICE.

CHARLES W. McCUTCHEN, OF PEEKSKILL, NEW YORK.

HOT-WATER-APPLIANCE HEATING APPARATUS.

SPECIFICATION forming part of Letters Patent No. 692,469, dated February 4, 1902.

Application filed February 21, 1901. Serial No. 48,349. (No model.)

*To all whom it may concern:*

Be it known that I, CHARLES W. McCUTCHEN, a citizen of the United States, and a resident of Peekskill, in the county of Westchester and State of New York, have invented a certain new and useful Hot-Water-Appliance Heating Apparatus, of which the following is a specification.

This invention relates to the treatment of invalids with hot appliances through the medium of hot water in water-bags, water-beds, water-pillows, water-jackets, &c., and has for its object means for maintaining a constant and uniform heat in such appliances by the employment of devices that are applicable to such bags, beds, &c., as are already made and in use, thus obviating the abandonment of such articles and by so much simplifying the application of my invention and making it available at a moderate cost.

The objects are attained by the means set forth in this specification and the accompanying described drawings.

Figure I illustrates my invention applied to an ordinary hot-water bag. Fig. II represents the funnel-mouth and stopper of a hot-water bag. Fig. III is a cross-section, in elevation, of a water-bag stopper adapted for use with my apparatus and forming a part of my invention. Fig. IV is a cross-section, in elevation, of a water-bag stopper, showing some of the details of my invention. Fig. V represents a plan of arranging connecting-tubes in the stoppers for hot-water bottles. Fig. VI is a vertical cross-section of Fig. V on line $y$.

My invention consists, primarily, of means for heating water, of controlling the means of heating, of indicating the temperature of the water, of means for conveying the water to and from the receptacle to be heated, of means for making the water-tube connections through the stopper of the water-receptacle, and of means to maintain a regulatable pressure upon the apparatus and of regulating the quantity of water to be contained in the receptacle to be supplied with hot water.

In Fig. I, $f$ represents a water-heater that may be made of sheet metal, light and easily portable, or it may be of cast metal and be mounted on a spreading base having a weight and stability that would preserve it from being easily upset. Such is the form of the one shown, the heater resting in or it may be secured to the ring $h$, which is provided with spreading supports $g$. An arch $r$, springing from the said supports, is made to sustain a lamp $l$. The lamp has a screw $p$ secured to its bottom or to a cup to receive the lamp, and the screw turns in the hub $s$ of the arch $r$. The heat to the heater may be regulated by screwing the lamp up or down. This heater is preferably made to contain a substantial quantity of water.

When made for office and hospital use, weight in the heater may be considered a desirable feature; but a lighter construction of heater than is shown would be employed when portability is a consideration.

Some of the well-known thermostatic means of controlling the flame may be applied on apparatus where constant or prolonged use would make the matter of refilling the lamp or the amount of fluid consumed considerations of importance.

A thermometer $o$ is attached to the heater. In the apparatus shown the water is taken from the top of the heater at $m$, flows through the tube $e$ to the water-bag $a$, and thence through the tube $e'$ it returns to the heater, entering it at the bottom through the pipe $d$. The outlet at $m$ and the return-pipe at $m'$ are curved, so as to incline the tube connections in the direction of the tube extensions in order to avoid short bends of the tubes and consequent partial closures of the tubes at those points. The return-pipe $d$ is shown to have a branch $n$, provided with a stop-cock $n'$. When a low temperature is to be carried in the apparatus, the stop-cock may be closed, and the apparatus operates as a closed system. The stop-cock $n'$ is adapted for a tube connection, as $j$, which is continued to an "expansion-tank," or, as it will be called herein, an "expansion-cup." In the ordinary use of a water-bag there would be no fear of generating an explosive pressure in the apparatus, as the invalid would give an alarm long before a pressure temperature could be attained, and, besides, the lamp would be so proportioned to a heater that even carelessness on the part of an attendant would not result in a temperature liable to burn the invalid; but this method of maintaining the heat in a bag enlarges the purposes for which such appliances may be used. It is often desirable to induce perspiration by means of heated articles under the bedclothes, but not in contact with the patient. For such use the temperature of the apparatus may be increased even to the boiling-point. In such cases the expansion-cup becomes a necessity, as with it water may be maintained at the boiling-point without pressure or fear of pressure. The cup may be placed on a shelf, or by a ring attached to it, as at $q$, it may be hung on the wall, or it may be adjusted in height on a rod attached to the heater-support, as indicated by broken lines 4, and a fastening-screw 5. The employment of the expansion-cup has another important advantage. When a water-bag is full of water, the weight may be objectionable and even detrimental to a patient, and aside from these considerations a full water-bag will not adapt itself to the undulations of the body. The bag being filled to start with, the expansion-cup may be lowered, so as to bring the water-line to a height that will produce just the desired expansion of the water-bag. When the expansion-cup is to be used, of course the cock $n'$ would be opened. When the cup is not to be used, its connecting-tube may be detached from the heater.

In the application of the heating apparatus just described to water-bags and such appliances it is my design to make the water-bags, &c., that are already manufactured and in use available and not rely wholly upon the making of special hot-water bags, beds, &c.

Fig. II illustrates the funnel-like mouth $b$ of a water-bag $a$. A metallic screw-nut $c'$, with a packing-seat $v$, is incorporated in the mouth of the bag during its vulcanization. A metallic stopper $c$ is made to fit this nut and is provided with packing $v'$, which being screwed against the seat $v$ makes a water-tight joint.

In my apparatus a special stopper is adapted to take the place of the regular stopper $c$. A form of this substitute stopper is shown in Fig. III. It conforms in general shape with the regular stopper, the projecting tubes serving the purpose of the handle $c''$ in Fig. II. It is also provided with a ring $v'$ of packing. Two tubes $t$ and $t'$ are inserted in the stopper. The stoppers may be so adjusted that when screwed into a receptacle, as a water-bag, the tubes will by preference be made to stand in the same vertical plane, as shown. The outwardly-projecting ends of the tubes are given a downward curve for the same reason as given for curving the tube connections on the heater. The end $t''$ of the top tube that projects within the bag terminates in a slight upward curve, preferably. The bottom tube at its inner end $t'''$ will give the best results if made either shorter or longer than the upper tube, and it is preferably beveled bottomward, as at $t^2$. The upper tube has a like bevel at its extremity $t'$, so that if the bag should be only partially filled with water the sagging of the top of the bag could not close the outlet from the tube. The ends of the tubes being separated—that is, one being longer than the other—the water that enters the upper tube will not have a tendency to at once return through the lower tube. In large appliances it may be desirable in order to induce a thorough circulation to extend one of the tubes to the end of the receptacle remote from the point of its entrance. In such cases it would be best to extend the inflow-tube, and this extension may be flexible. Such an extended tube is shown in Fig. IV, and to prevent the end of the tube sinking to the bottom of the bag or other receptacle the end of the tube is shown to be provided with an air-ball $t^3$, which surrounds the tube and will cause it to float.

It is not absolutely essential that the tubes stand one above the other, provided precautions be taken to have them properly inserted in the bag. Fig. V represents the tubes lying in the same horizontal plane, having their outer ends adapted for curved tube connections and the inner ends adapted to promote the best circulation by the positions of the inlet $t''$ and outflow $t'''$. Fig. VI shows in cross-section and in elevation the halves of the two tubes to the right of the line $y$, Fig. V. In Fig. I the tubes $t\ t'$ are shown to be in neither a vertical nor horizontal plane.

As the presence of air in the apparatus is liable to interfere with the proper circulation of the water, an air-valve $u$ is applied to one of the tubes in the stopper. By means of a screw and the outlets 1 2 through the valve any accumulation of air is easily avoided. No particular form of air-valve is required, and it may be inserted directly in the appliance.

I wish to explain that what has herein been said in relation to the avoidance of pressure in this apparatus that may be derived from a high degree of heat does not apply to such appliances as beds, wherein the weight of a patient must necessarily put a pressure upon the entire apparatus. In hospitals or wherever the height of buildings would admit of it the expansion-cup could be carried to such an elevation as would afford a counterbalancing-weight to that of the patient on the bed, when the cup would become the means of making the bed very elastic and cause it to fit the body in a manner to greatly increase the utility of the bed.

The expansion-cup $x$ is connected with the pipe $d$ only for convenience. It is immaterial to which part of the apparatus it is applied so long as it communicates with the water in the system.

While my invention has been herein described chiefly in connection with hot-water bags, it is to be understood that it has been so described only for convenience and that the invention is equally applicable to all such forms of appliances.

Having described my invention, what I claim, and desire to secure by Letters Patent, is—

1. In a heating system, the combination of a heater, a collapsible radiator, a flexible supply-pipe and a flexible return-pipe connecting the water-heater with the radiator and forming therewith a circuit, a vertically-adjustable reservoir connected to the return-pipe of the circuit by a single flexible pipe whereby upon adjusting the reservoir at different elevations the pressure and quantity of liquid circulating in the circuit may be changed, substantially as set forth.

2. In a heating system, the combination of a heater, a collapsible radiator, a flexible supply-pipe and a flexible return-pipe connecting the water-heater with the radiator and forming therewith a circuit, a vertically-adjustable reservoir connected to the return-pipe by a flexible pipe whereby upon adjusting the reservoir at different elevations the pressure and quantity of liquid in the collapsible radiator may be changed, and a controlling-cock in the pipe connecting the reservoir to the return-pipe, substantially as herein set forth.

3. In a heating system the combination of a heater, a collapsible radiator, a flexible supply-pipe and a flexible return-pipe connecting the water-heater with the radiator and forming a circuit therewith, a removable stopper in the radiator having tubes therein to which the supply and return pipes are connected, a vertically-adjustable reservoir connected to the return-pipe of the circuit by a single flexible pipe whereby upon adjusting the reservoir at different elevations the pressure and quantity of liquid circulating in the circuit may be changed.

4. In a heating system, the combination of a heater, a collapsible radiator, a flexible supply-pipe and a flexible return-pipe connecting the water-heater with the radiator and forming therewith a circuit, a vertically-adjustable reservoir connected to the return-pipe of the circuit by a single flexible pipe whereby upon adjusting the reservoir at different elevations the pressure and quantity of liquid circulating in the circuit may be changed, a removable stopper in the radiator having tubes therein to which the supply and return pipes are connected, and a flexible extension of the supply-tube within the radiator provided with a float at its extremity, substantially as herein set forth.

5. In a heating system, the combination of a heater, a collapsible radiator, a flexible supply-pipe and a flexible return-pipe connecting the water-heater with the radiator and forming therewith a circuit, a vertically-adjustable reservoir connected to the return-pipe of the circuit by a single flexible pipe whereby upon adjusting the reservoir at different elevations the pressure and quantity of liquid circulating in the circuit may be changed, and an air-valve in one of the radiator-tube connections, substantially as herein set forth.

Signed at Peekskill, in the county of Westchester and State of New York, this 9th day of February, A. D. 1900.

CHARLES W. McCUTCHEN.

Witnesses:
H. ALBAN ANDERSON,
GEO. E. GILMARTIN.